United States Patent
Harada et al.

(10) Patent No.: US 12,252,794 B2
(45) Date of Patent: Mar. 18, 2025

(54) METHOD FOR CONTROLLING HYDROGEN GENERATION SYSTEM, AND HYDROGEN GENERATION SYSTEM

(71) Applicant: ENEOS CORPORATION, Tokyo (JP)

(72) Inventors: Kosuke Harada, Tokyo (JP); Koji Matsuoka, Tokyo (JP); Hirofumi Takami, Tokyo (JP); Yasushi Sato, Tokyo (JP); Hirokazu Kojima, Koriyama (JP); Naoya Itou, Koriyama (JP); Taku Tsujimura, Koriyama (JP); Hirohide Furutani, Koriyama (JP)

(73) Assignee: ENEOS CORPORATION, Tokyo (JP)

( * ) Notice: Subject to any disclaimer, the term of this patent is extended or adjusted under 35 U.S.C. 154(b) by 647 days.

(21) Appl. No.: 17/630,767

(22) PCT Filed: Sep. 11, 2020

(86) PCT No.: PCT/JP2020/034440
§ 371 (c)(1),
(2) Date: Jan. 27, 2022

(87) PCT Pub. No.: WO2021/054255
PCT Pub. Date: Mar. 25, 2021

(65) Prior Publication Data
US 2022/0316075 A1   Oct. 6, 2022

(30) Foreign Application Priority Data
Sep. 20, 2019  (JP) .................. 2019-171593

(51) Int. Cl.
C25B 1/04      (2021.01)
C25B 9/77      (2021.01)
C25B 15/033    (2021.01)

(52) U.S. Cl.
CPC .................. *C25B 1/04* (2013.01); *C25B 9/77* (2021.01); *C25B 15/033* (2021.01)

(58) Field of Classification Search
CPC ........... C25B 1/04; C25B 9/77; C25B 15/033; C25B 9/23; C25B 15/023; C25B 15/08; C25B 15/02; Y02E 60/36; Y02P 20/133
See application file for complete search history.

(56) References Cited

U.S. PATENT DOCUMENTS

2013/0168237 A1   7/2013  Sugimasa
2019/0161874 A1   5/2019  Murata et al.

FOREIGN PATENT DOCUMENTS

JP    H01222082 A   *  9/1989
JP    2014091838 A      5/2014
(Continued)

OTHER PUBLICATIONS

International Search Report (PCT/ISA/210) with translation mailed on Nov. 24, 2020, by the Japan Patent Office as the International Searching Authority for International Application No. PCT/JP2020/034440. (5 pages).
(Continued)

*Primary Examiner* — Jacob M Amick
*Assistant Examiner* — Charles J Brauch
(74) *Attorney, Agent, or Firm* — BUCHANAN, INGERSOLL & ROONEY PC

(57) ABSTRACT

A method for controlling a hydrogen generation system includes controlling the potentials of an electrode for oxygen generation and an electrode for hydrogen generation included in an electrolyzer so that the potential change is smaller in the electrode for oxygen generation or the electrode for hydrogen generation having a larger deterioration rate than in the electrode having a smaller deterioration rate.

9 Claims, 5 Drawing Sheets

(56) References Cited

FOREIGN PATENT DOCUMENTS

| JP | 2017206731 A | 11/2017 |
|---|---|---|
| JP | 2019019379 A | 2/2019 |
| JP | 2019099905 A | 6/2019 |
| WO | 2012043085 A1 | 4/2012 |

OTHER PUBLICATIONS

International Preliminary Report on Patentability (Form PCT/IB/373) and Written Opinion (PCT/ISA/237) with translation mailed on Mar. 31, 2022, by the Japan Patent Office as the International Searching Authority for International Application No. PCT/JP2020/034440. (10 pages).

* cited by examiner

FIG. 2

| UNIT: COULOMB | TEMPERATURE IS SET AT 80° C IN ALL CALCULATION | |
|---|---|---|
| | AT STOP OF SUPPLY OF ELECTROLYTIC POWER | AT STOP OF WATER CIRCULATION TO ANODE CHAMBER |
| $Q_{AN\_electrode}$ | 0.5 | 0.5 |
| $Q_{AN\_O_2}$ | 21.0 | 0.5 |
| $Q_{AN\ total}$ | 21.5 | 1.0 |
| $Q_{CA\_electrode}$ | 3.2 | 3.2 |
| $Q_{CA\_H_2}$ | 17.2 | 17.2 |
| $Q_{CA\ total}$ | 20.4 | 20.4 |

METHOD FOR CONTROLLING HYDROGEN GENERATION SYSTEM, AND HYDROGEN GENERATION SYSTEM

CROSS-REFERENCE TO RELATED APPLICATIONS

This application is based upon and claims the benefit of priority from the prior Japanese Patent Application No. 2019-171593, filed on Sep. 20, 2019, and International Patent Application No. PCT/JP2020/034440, filed on Sep. 11, 2020, the entire content of each of which is incorporated herein by reference.

BACKGROUND

Field of Invention

The present invention relates to a method for controlling a hydrogen generation system and a hydrogen generation system.

Description of the Related Art

As a device structured to generate hydrogen, an electrochemical device (water electrolysis device) has been conventionally devised in which a solid polymer ion exchange membrane is used. In this electrochemical device, a current is applied between the electrodes with a power source while water is supplied to the anode or both the electrodes, and thus oxygen and hydrogen are obtained by electrolysis of water. Meanwhile, it is known that in such an electrochemical device, a reverse current is generated in the electrochemical cell when power supply is stopped, leading to deterioration of the electrodes (see Patent Literature 1). In addition, it is known that gas crossover (cross leakage) between the electrodes also causes deterioration of the electrodes during a stop of power supply.

Patent Literature

Patent Literature 1: JP-A-1-222082

Renewable energy obtained by wind power generation, solar power generation, or the like has recently attracted attention as energy capable of reducing the amount of carbon dioxide emission in the generation process as compared with energy obtained by thermal power generation. Furthermore, a system has been developed in which the above-described electrochemical device or the like is used for producing hydrogen using renewable energy. However, the output from a wind or solar power generator fluctuates frequently, and becomes zero in windless conditions and some weather conditions. Therefore, in the case of using a wind or solar power generator as a power source of the electrochemical device, the electrochemical device frequently repeats stopping and starting. Therefore, it is to be suppressed that an irregularly occurring stop of the electrochemical device causes deterioration of the electrode.

The electrochemical device as described above is generally continuously operated using stable electric power such as energy obtained by thermal power generation. Therefore, the electrochemical device is stopped mainly in a case where the power source is intentionally stopped, and it is relatively easy to take measures against deterioration of the electrode due to a stop of the electrochemical device. Meanwhile, sufficient studies have not been performed on problems in a system structured to generate hydrogen by combining renewable energy and an electrochemical device. As a result of intensive studies to realize realistic hydrogen production in which renewable energy and an electrochemical device are combined, the present inventors have conceived a technique to suppress deterioration of an electrode due to a large number of stops of supply of renewable energy and further improve the durability of a hydrogen generation system.

SUMMARY OF THE INVENTION

The present invention has been made in view of such a situation, and an object of the present invention is to provide a technique to improve the durability of a hydrogen generation system in which electrolysis of water is performed.

An aspect of the present invention is a method for controlling a hydrogen generation system including an electrolyzer structured to generate hydrogen by electrolysis of water and including a power source structured to supply an electrolytic current to the electrolyzer. The electrolyzer includes an electrode for oxygen generation, an electrode for hydrogen generation, an oxygen generation electrode chamber accommodating the electrode for oxygen generation, a hydrogen generation electrode chamber accommodating the electrode for hydrogen generation, and a diaphragm separating the oxygen generation electrode chamber and the hydrogen generation electrode chamber. The electrode for oxygen generation has a deterioration characteristic of deteriorating at a predetermined deterioration rate $d_{AN}$ by a potential change generated during an operation stop in which the electrolytic current is not supplied to the electrolyzer, and the electrode for hydrogen generation has a deterioration characteristic of deteriorating at a predetermined deterioration rate $d_{CA}$ by a potential change generated during the operation stop. The method for controlling according to an aspect of the present invention includes controlling a potential of the electrode for oxygen generation and a potential of the electrode for hydrogen generation so that, the potential change is smaller in the electrode for oxygen generation or the electrode for hydrogen generation having a larger deterioration rate than in the electrode having a smaller deterioration rate.

Another aspect of the present invention is a hydrogen generation system. The hydrogen generation system includes: an electrolyzer that includes an electrode for oxygen generation, an electrode for hydrogen generation, an oxygen generation electrode chamber accommodating the electrode for oxygen generation, a hydrogen generation electrode chamber accommodating the electrode for hydrogen generation, and a diaphragm separating the oxygen generation electrode chamber and the hydrogen generation electrode chamber, and is structured to generate hydrogen by electrolysis of water; a power source structured to supply an electrolytic current to the electrolyzer; and a controller structured to control a potential of the electrode for oxygen generation and a potential of the electrode for hydrogen generation. The electrode for oxygen generation has a deterioration characteristic of deteriorating at a predetermined deterioration rate $d_{AN}$ by a potential change generated during an operation stop in which the electrolytic current is not supplied to the electrolyzer, and the electrode for hydrogen generation has a deterioration characteristic of deteriorating at a predetermined deterioration rate $d_{CA}$ by a potential change generated during the operation stop. The controller is structured to control a potential of the electrode for oxygen generation and a potential of the electrode for hydrogen generation so that, the potential change is smaller in the electrode for oxygen generation or the electrode for hydrogen generation having a larger deterioration rate than in the electrode having a smaller deterioration rate.

Any combinations of the above-described constituent elements and expressions in the present disclosure are converted between methods, devices, systems, and the like, and the resulting methods, devices, systems, and the like are effective as aspects of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 is a table showing the amounts of charge possessed by both electrodes and both electrode chambers at a stop of electrolysis and at a stop of water circulation to an oxygen generation electrode chamber when stepwise stop control according to Example 1 is performed.

DETAILED DESCRIPTION OF THE INVENTION

Figure 1:
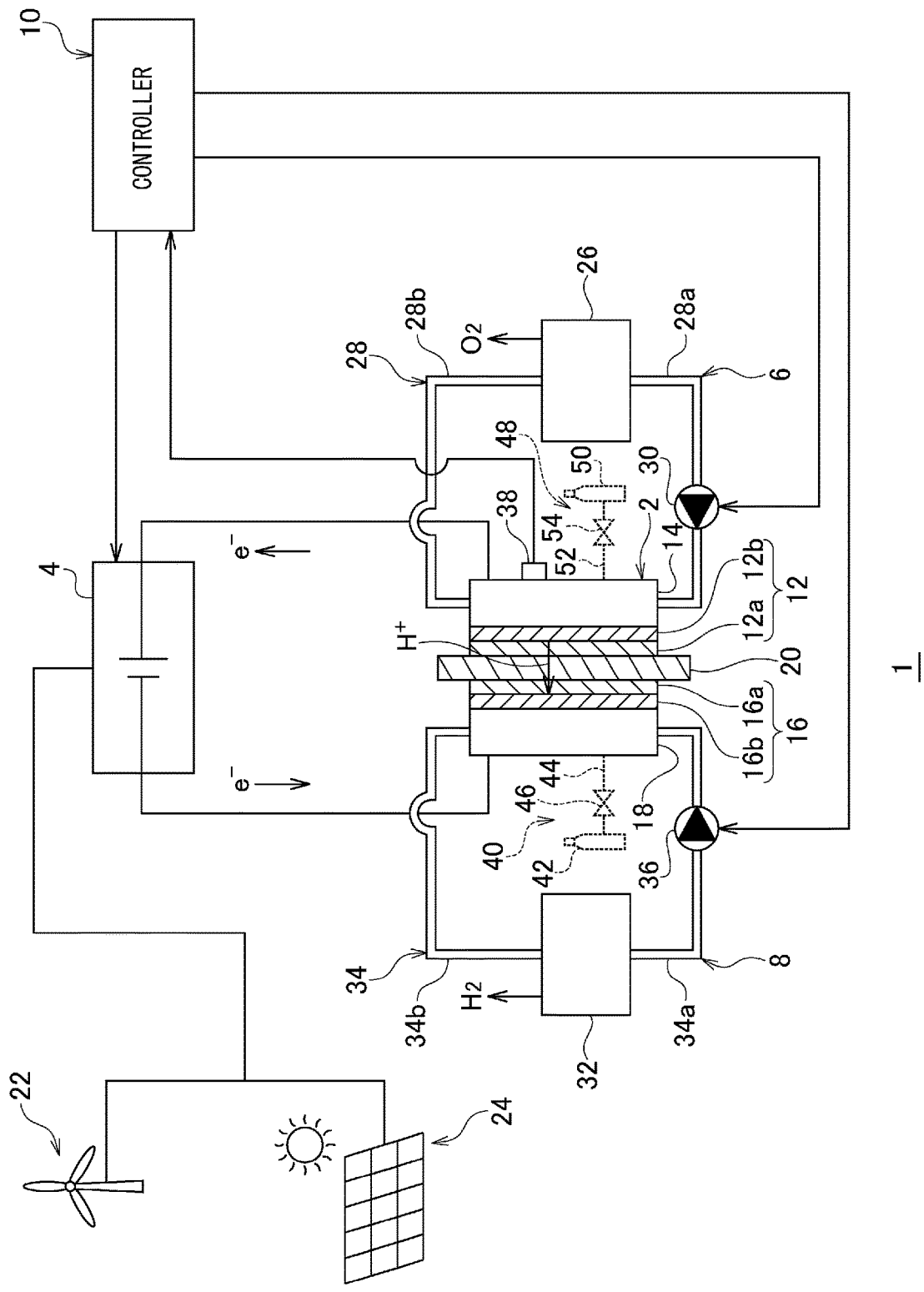
FIG. 1 is a schematic diagram of a hydrogen generation system according to an embodiment.

Hereinafter, the present invention will be described on the basis of preferred embodiments with reference to the drawings. Embodiments are not intended to limit the invention but are an example, and all features described in embodiments and combinations of the features are not necessarily essential to the invention. The same or equivalent constituent elements, members, and processes illustrated in the drawings are denoted by the same reference signs, and redundant description will be appropriately omitted.

The scale and the shape of each part illustrated in each drawing are set for convenience in order to facilitate the description, and are not to be construed as being limited unless otherwise specified. When the terms "first", "second", and the like are used in the present description or claims, the terms do not represent any order or importance, but are used to distinguish one configuration from another configuration. The drawings omit some members that are not important for describing an embodiment.

FIG. 1 is a schematic diagram of a hydrogen generation system according to an embodiment. A hydrogen generation system 1 includes an electrolyzer 2, a power source 4, a first transfer mechanism 6, a second transfer mechanism 8, and a controller 10.

The electrolyzer 2 generates hydrogen by electrolysis of water. The electrolyzer 2 according to the present embodiment is a polymer electrolyte membrane (PEM) water electrolyzer in which an ion exchange membrane is used. The electrolyzer 2 includes an electrode for oxygen generation 12, an oxygen generation electrode chamber 14, an electrode for hydrogen generation 16, a hydrogen generation electrode chamber 18, and a diaphragm 20.

The electrode for oxygen generation 12 is an electrode in which an oxidation reaction occurs, and is defined as an anode. The electrode for oxygen generation 12 includes a catalyst layer 12a and a gas diffusion layer 12b. The catalyst layer 12a contains, for example, iridium (Ir) or platinum (Pt) as a catalyst. The catalyst layer 12a may contain another metal or a metal compound. The catalyst layer 12a is placed so as to be in contact with one main surface of the diaphragm 20. The gas diffusion layer 12b includes a conductive porous material or the like. As a material included in the gas diffusion layer 12b, a known material can be used. The electrode for oxygen generation 12 is accommodated in the oxygen generation electrode chamber 14. The oxygen generation electrode chamber 14 has a space excluding the electrode for oxygen generation 12, and the space forms a flow path of water and oxygen.

The electrode for hydrogen generation 16 is an electrode in which a reduction reaction occurs, and is defined as a cathode. The electrode for hydrogen generation 16 includes a catalyst layer 16a and a gas diffusion layer 16b. The catalyst layer 16a contains, for example, platinum (Pt) as a catalyst. The catalyst layer 16a may contain another metal or a metal compound. The catalyst layer 16a is placed so as to be in contact with the other main surface of the diaphragm 20. The gas diffusion layer 16b includes a conductive porous material or the like. As a material included in the gas diffusion layer 16b, a known material can be used. The electrode for hydrogen generation 16 is accommodated in the hydrogen generation electrode chamber 18. The hydrogen generation electrode chamber 18 has a space excluding the electrode for hydrogen generation 16, and the space forms a flow path of water and hydrogen.

The oxygen generation electrode chamber 14 and the hydrogen generation electrode chamber 18 are separated from each other by the diaphragm 20. The diaphragm 20 is placed between the electrode for oxygen generation 12 and the electrode for hydrogen generation 16. The diaphragm 20 of the present embodiment includes a solid polymer electrolyte membrane. The solid polymer electrolyte membrane is not particularly limited as long as it is a material that conducts protons ($H^+$), and examples of the solid polymer electrolyte membrane include fluorine-based ion exchange membranes having a sulfonate group.

The reaction at the time of electrolysis of water in the electrolyzer 2 is as follows.

Anode (positive electrode) reaction at the time of electrolysis: $2H_2O \rightarrow O_2 + 4H^+ + 4e^-$ Cathode (negative electrode) reaction at the time of electrolysis: $4H^+ + 4e^- \rightarrow 2H_2$ In the electrode for oxygen generation 12, water is electrolyzed to generate an oxygen gas, protons, and electrons. The protons move through the diaphragm 20 to the electrode for hydrogen generation 16. The electrons flow into the positive electrode of the power source 4. The oxygen gas is discharged to the outside through the oxygen generation electrode chamber 14. In the electrode for hydrogen generation 16, electrons supplied from the negative electrode of the power source 4 and the protons having moved through the diaphragm 20 react to generate a hydrogen gas. The hydrogen gas is discharged to the outside through the hydrogen generation electrode chamber 18.

The power source 4 is a direct-current power source that supplies an electrolytic current to the electrolyzer 2. The power source 4 supplies an electrolytic current to apply a predetermined electrolysis voltage between the electrode for oxygen generation 12 and the electrode for hydrogen generation 16 in the electrolyzer 2. The power source 4 of the present embodiment converts input power derived from renewable energy and supplies an electrolytic current to the electrolyzer 2. For example, a wind power generator 22 and a solar power generator 24 that generate power derived from renewable energy are connected to the power source 4. For example, in a case where alternating current renewable energy is input to the power source 4, the power source 4 includes a transformer that converts the voltage, a bridge diode that rectifies the current, a smoothing electrolytic capacitor that smooths the current, and an output terminal that supplies the electrolytic current to the electrolyzer 2. Thus, electrolysis of water can be performed using renewable energy. Power to be supplied to the power source 4 is not limited to power derived from renewable energy.

The first transfer mechanism 6 is a mechanism structured to transfer water to the oxygen generation electrode chamber 14. The first transfer mechanism 6 includes a first circulation tank 26, a first circulation path 28, and a first circulator 30. The first circulation tank 26 accommodates water to be supplied to the oxygen generation electrode chamber 14 and recovered from the oxygen generation electrode chamber 14. The first circulation tank 26 of the present embodiment accommodates pure water.

The first circulation tank 26 and the oxygen generation electrode chamber 14 are connected via the first circulation path 28. The first circulation path 28 includes an outward part 28a structured to supply water from the first circulation tank 26 to the oxygen generation electrode chamber 14, and a return part 28b structured to recover water from the oxygen generation electrode chamber 14 to the first circulation tank 26. The first circulator 30 is provided within the outward part 28a. The first circulator 30 is driven to make water flow in the first circulation path 28 and circulate between the first circulation tank 26 and the oxygen generation electrode chamber 14. As the first circulator 30, various pumps such as gear pumps and cylinder pumps, gravity flow devices, and the like can be used.

The first circulation tank 26 also functions as a gas-liquid separator. In the electrode for oxygen generation 12, oxygen is generated by the electrode reaction. Therefore, the water recovered from the oxygen generation electrode chamber 14 contains gaseous oxygen and dissolved oxygen. The gaseous oxygen is separated from the water in the first circulation tank 26 and taken out of the system. After the oxygen is separated, the resulting water is supplied to the electrolyzer 2 again.

The second transfer mechanism 8 is a mechanism structured to transfer water to the hydrogen generation electrode chamber 18. The second transfer mechanism 8 includes a second circulation tank 32, a second circulation path 34, and a second circulator 36. The second circulation tank 32 accommodates water to be supplied to the hydrogen generation electrode chamber 18 and recovered from the hydrogen generation electrode chamber 18. The second circulation tank 32 of the present embodiment accommodates pure water.

The second circulation tank 32 and the hydrogen generation electrode chamber 18 are connected via the second circulation path 34. The second circulation path 34 includes an outward part 34a structured to supply water from the second circulation tank 32 to the hydrogen generation electrode chamber 18, and a return part 34b structured to recover water from the hydrogen generation electrode chamber 18 to the second circulation tank 32. The second circulator 36 is provided within the outward part 34a. The second circulator 36 is driven to make water flow in the second circulation path 34 and circulate between the second circulation tank 32 and the hydrogen generation electrode chamber 18. As the second circulator 36, various pumps such as gear pumps and cylinder pumps, gravity flow devices, and the like can be used.

The second circulation tank 32 also functions as a gas-liquid separator. In the electrode for hydrogen generation 16, hydrogen is generated by the electrode reaction. Therefore, the water recovered from the hydrogen generation electrode chamber 18 contains gaseous hydrogen and dissolved hydrogen. The gaseous hydrogen is separated from the water in the second circulation tank 32 and taken out of the system. After the hydrogen is separated, the resulting water is supplied to the electrolyzer 2 again. In a case where the electrolyzer 2 is a PEM water electrolyzer, the second transfer mechanism 8 can be omitted. In this case, a pipe structured to take a hydrogen gas out of the system is connected to the hydrogen generation electrode chamber 18.

The controller 10 controls the potential of the electrode for oxygen generation 12 and the potential of the electrode for hydrogen generation 16. In the controller 10, the hardware configuration is realized by an element or a circuit such as a central processing unit or a memory of a computer, and the software configuration is realized by a computer program or the like. FIG. 1 illustrates the controller 10 as a functional block realized by cooperation between the hardware configuration and the software configuration. Those skilled in the art naturally understand that the functional block can be realized in various forms depending on a combination of hardware and software.

A potential detector 38 provided for the electrolyzer 2 inputs, to the controller 10, a signal indicating the potential of the electrode for oxygen generation 12 and the potential of the electrode for hydrogen generation 16, or the voltage of the electrolyzer 2 (that is, cell voltage). The potential of each electrode and the voltage of the electrolyzer 2 can be detected with a known method. For example, a reference electrode is provided for the diaphragm 20. The reference electrode is held at a reference electrode potential. For example, the reference electrode is a reversible hydrogen electrode (RHE). The potential detector 38 detects the potential of each electrode with respect to the reference electrode, and transmits the detection result to the controller 10. The potential detector 38 includes, for example, a known voltmeter.

On the basis of the detection result of the potential detector 38, the controller 10 controls the output of the power source 4, the driving of the first circulator 30 and the second circulator 36, and the like during operation of the hydrogen generation system 1. Furthermore, the controller 10 controls the power source 4, the first circulator 30, the second circulator 36, and the like at the time of, for example, a shift to an operation stop of the hydrogen generation system 1, during an operation stop, and at the time of an operation start under the electrode deterioration suppression control described below. The terms "operation" and "during operation" of the hydrogen generation system 1 refer to a state in which an electrolytic current is supplied from the power source 4 to the electrolyzer 2. The terms "operation stop" and "during an operation stop" refer to a state in which no electrolytic current is supplied from the power source 4 to the electrolyzer 2 (supply of an electrolytic current is stopped).

Although FIG. 1 illustrates only one electrolyzer 2, the hydrogen generation system 1 may include a plurality of electrolyzers 2. In this case, the plurality of electrolyzers 2 are aligned so that the oxygen generation electrode chamber 14 and the hydrogen generation electrode chamber 18 in each electrolyzer 2 are arranged in the same direction, and the plurality of electrolyzers 2 are stacked with an energizing plate interposed therebetween. Thus, the plurality of electrolyzers 2 are electrically connected in series. The energizing plate includes a conductive material such as a metal.

The electrolyzer 2 may be an alkaline water electrolyzer. In this case, the first circulation tank 26 and the second circulation tank 32 accommodate an ion conductive electrolytic solution, and specific examples of the ion conductive electrolytic solution include alkali aqueous solutions such as a potassium hydroxide (KOH) aqueous solution and a sodium hydroxide (NaOH) aqueous solution. The diaphragm 20 includes a known material such as polytetrafluoroethylene (PTFE)-bonded potassium titanate, PTFE-bonded zirconia, or sintered nickel.

Cause of Potential Change Occurring During Operation Stop

When supply of an electrolytic current from the power source 4 to the electrolyzer 2 is stopped to stop the operation of the hydrogen generation system 1 accordingly, gas crossover may occur via the diaphragm 20. Specifically, a part of the oxygen gas generated in the electrode for oxygen generation 12 passes through the diaphragm 20 and moves to the electrode for hydrogen generation 16 side. A part of the hydrogen gas generated in the electrode for hydrogen generation 16 passes through the diaphragm 20 and moves to the electrode for oxygen generation 12 side. If gas crossover occurs, in the electrode for oxygen generation 12, the remaining oxygen gas and the hydrogen gas having moved from the electrode for hydrogen generation 16 side react to generate water. Similarly, in the electrode for hydrogen generation 16, the remaining hydrogen gas and the oxygen gas having moved from the electrode for oxygen generation 12 side react to generate water.

When the operation of the hydrogen generation system 1 is stopped, a current in the direction opposite to that during electrolysis, that is, a reverse current may flow through the first circulation path 28, the second circulation path 34, or the like using, as an electromotive force, a potential difference between the reduction reaction of oxygen in the electrode for oxygen generation 12 and the oxidation reaction of hydrogen in the electrode for hydrogen generation 16.

The reverse reaction after the stop of electrolysis of water in the electrolyzer 2 is as follows.

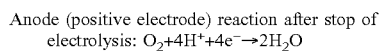

Anode (positive electrode) reaction after stop of electrolysis: $O_2 + 4H^+ + 4e^- \rightarrow 2H_2O$

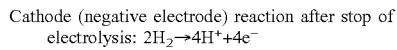

Cathode (negative electrode) reaction after stop of electrolysis: $2H_2 \rightarrow 4H^+ + 4e^-$ If gas crossover occurs or a reverse current is generated, the oxygen in the oxygen generation electrode chamber 14 and the hydrogen in the hydrogen generation electrode chamber 18 are consumed in amounts such that the corresponding amounts of charge are equivalent. That is, two molecules of hydrogen are consumed for one molecule of oxygen by the above-described reaction. If, in one of the electrode chambers, the remaining oxygen or hydrogen is exhausted and the capacitance of the electrode itself is consumed, the potential of both the electrodes change to the oxidation-reduction potential of the electrode in which oxygen or hydrogen remains at that time. That is, when the operation of the hydrogen generation system 1 is stopped, the potential of the electrode for oxygen generation 12 and the potential of the electrode for hydrogen generation 16 change to the potential of the electrode having a larger total amount of the total amount of the oxidizing agent in the oxygen generation electrode side and the total amount of the reducing agent in the hydrogen generation electrode side.

The total amount of the oxidizing agent in the oxygen generation electrode side and the total amount of the reducing agent in the hydrogen generation electrode side can be calculated in terms of the amount of electricity (amount of charge) as follows.

Total amount of oxidizing agent (amount of electricity)=electrode capacitance of oxygen generation electrode+number of reaction electrons×Faraday constant×number of moles of oxygen in electrode chamber Total amount of reducing agent (amount of electricity)=electrode capacitance of hydrogen generation electrode+number of reaction electrons× Faraday constant×number of moles of hydrogen in electrode chamber In the above-described formula, the number of moles of oxygen is the total number of moles of oxygen dissolved in water and oxygen in a gas state. Similarly, the number of moles of hydrogen is the total number of moles of hydrogen dissolved in water and hydrogen in a gas state.

In the electrolyzer 2 of the present embodiment during operation or immediately after an operation stop of the hydrogen generation system 1, the potential of the electrode for oxygen generation 12 is 1.2 V (vs. RHE) or more, and the potential of the electrode for hydrogen generation 16 is about 0 V (vs. RHE) or less. If gas crossover occurs or a reverse current is generated during an operation stop of the hydrogen generation system 1, the potential of the electrode for oxygen generation 12 may decrease to the oxidation-reduction potential of the oxygen generation electrode catalyst or less, or the potential of the electrode for hydrogen generation 16 may increase to the oxidation-reduction potential of the hydrogen generation electrode catalyst or more.

Such a potential change causes, for example, the catalyst to change in valence, elute, or aggregate, thus leading to progress of deterioration of the electrode whose potential has changed. If deterioration of the electrode progresses, the electrolysis overvoltage in the electrolyzer 2 increases to increase the amount of power required for generating a unit mass of hydrogen. When the amount of power required for generating hydrogen increases and the hydrogen generation efficiency falls below a predetermined value, the electrolyzer 2 reaches the end of its life. The reference life as a result of deterioration of the electrode is the life in a case where the voltage during electrolysis in the electrolyzer 2 (in the case of a current density of 1 A/cm²) increases by 20%.

In particular in a case where the electrolyzer 2 is an alkaline water electrolyzer and an electrolytic solution is transferred through the circulation path, the circulation path serves as an ion conduction path. Therefore, a reverse current is more likely to be generated than in the PEM water electrolyzer in which pure water is transferred through the first circulation path 28 (and also through the second circulation path 34 in some cases). Therefore, when the operation of the hydrogen generation system is stopped, a potential change in the electrode occurs in the alkaline water electrolyzer at a higher rate than in the PEM water electrolyzer.

Note that even in the PEM water electrolyzer, a potential change may occur mainly due to gas crossover although the rate of change is low.

Measures Against Electrode Deterioration Caused by Potential Change

The probability that the potential of the electrode for oxygen generation 12 changes and the probability that the potential of the electrode for hydrogen generation 16 changes are normally unknown. The resistance of the electrode for oxygen generation 12 to reduction deterioration and the resistance of the electrode for hydrogen generation 16 to oxidation deterioration depend on the kind, the amount, and the like of the contained catalyst. Therefore, the number of potential changes required for reaching the life of the electrolyzer 2 in each electrode (hereinafter, this number is appropriately referred to as the number of life) generally varies largely.

The electrode for oxygen generation 12 has a deterioration characteristic of deteriorating at a predetermined deterioration rate $d_{AN}$ by a potential change generated during an operation stop. The electrode for hydrogen generation 16 has a deterioration characteristic of deteriorating at a predetermined deterioration rate $d_{CA}$ by a potential change generated during the operation stop. The deterioration rate $d_{AN}$ and the deterioration rate $d_{CA}$ are values (unit: V/cycle) obtained, in a case where the electrode for oxygen generation 12 and the electrode for hydrogen generation 16 are each subjected to a predetermined potential cycle test, by dividing the amount of change in voltage during rated electrolysis before and after the potential cycle test by the number of cycles. In the potential cycle test performed on the electrode for oxygen generation 12, the potential of the electrode for oxygen generation 12 during rated electrolysis in the hydrogen generation system 1 and the potential obtained by subtracting the overvoltage from the potential of the electrode for hydrogen generation 16 during the rated electrolysis are repeatedly applied to the electrode for oxygen generation 12. In the potential cycle test performed on the electrode for hydrogen generation 16, the potential of the electrode for hydrogen generation 16 during rated electrolysis in the hydrogen generation system 1 and the potential obtained by subtracting the overvoltage from the potential of the electrode for oxygen generation 12 during the rated electrolysis are repeatedly applied to the electrode for hydrogen generation 16.

For example, in the potential cycle test, the potential of the electrode for oxygen generation 12 during rated electrolysis and the potential of the opposite side electrode immediately after the stop of the electrolysis, that is, the potential of the electrode for hydrogen generation 16 after the overvoltage disappears from the potential during the rated electrolysis are repeatedly applied to the electrode for oxygen generation 12. Similarly, the potential of the electrode for hydrogen generation 16 during rated electrolysis and the potential of the opposite side electrode immediately after the stop of the electrolysis, that is, the potential of the electrode for oxygen generation 12 after the overvoltage disappears from the potential during the rated electrolysis are repeatedly applied to the electrode for hydrogen generation 16. For example, to the electrode for oxygen generation 12, a potential of 1.5 V and a potential of 0 V are repeatedly applied. To the electrode for hydrogen generation 16, a potential of −0.2 V and a potential of 1.2 V are repeatedly applied.

This potential cycle test generally causes progress of deterioration of the electrode catalyst. As the number of cycles increases, the voltage during rated electrolysis gradually increases. Therefore, when a value obtained by dividing the increase amount (change amount) of the voltage by the number of cycles is defined as a deterioration rate, the electrode for oxygen generation 12 has a deterioration characteristic of deteriorating at a deterioration rate $d_{AN}$, and the electrode for hydrogen generation 16 has a deterioration characteristic of deteriorating at a deterioration rate $d_{CA}$.

It is assumed that the electrolyzer 2 reaches the end of its life when the voltage during rated electrolysis increases by 0.3 V. In a case where the deterioration rate of the electrode that is less likely to deteriorate is 0.00003 V/cycle and the deterioration rate of the electrode that is likely to deteriorate is 0.0003 V/cycle, and in a case where the potential change is not controlled, a bottleneck is made due to the number of life of the electrode that is likely to deteriorate, and the electrolyzer 2 reaches the end of its life after a minimum of 1,000 operation stops, and even if the times of potential fluctuations in both the electrodes are the same, after 2,000 operation stops. In a case where the potential change is caused only in the electrode that is less likely to deteriorate, up to 10,000 operation stops can be allowed. Therefore, for extending the life of the electrolyzer 2, it is important to allow the potential change in the electrode that is less likely to deteriorate and to suppress the potential change in the electrode that is likely to deteriorate during an operation stop of the hydrogen generation system 1.

Therefore, the method for controlling the hydrogen generation system 1 according to the present embodiment includes controlling the potential of the electrode for oxygen generation 12 and the potential of the electrode for hydrogen generation 16 so that the potential change is smaller in the electrode for oxygen generation 12 or the electrode for hydrogen generation 16 having a larger deterioration rate due to the potential change generated during an operation stop in which no electrolytic current is supplied to the electrolyzer 2 than in the electrode having a smaller deterioration rate. The life of the electrolyzer 2 can be extended by comparing the deterioration rate $d_{AN}$ of the electrode for oxygen generation 12 with the deterioration rate $d_{CA}$ of the electrode for hydrogen generation 16 and suppressing the potential change in the electrode having a larger deterioration rate.

For example, in a case where the deterioration rate $d_{CA}$ of the electrode for hydrogen generation 16 is larger than the deterioration rate $d_{AN}$ of the electrode for oxygen generation 12, the life of the electrolyzer 2 can be extended by controlling the potential of both the electrodes so that the potential increase amount in the electrode for hydrogen generation 16 is smaller than the potential decrease amount in the electrode for oxygen generation 12. In a case where one of the deterioration rates of both the electrodes is 2 times or more of the other ($d_{AN}/d_{CA}<0.5$ or $d_{CA}/d_{AN}<0.5$), it is considered that the life of the electrolyzer 2 can be effectively extended by suppressing the potential change in the electrode having a larger deterioration rate.

In order to suppress the potential change in the electrode having a larger deterioration rate, a state is to be kept, during an operation stop of the hydrogen generation system 1, in which the sum of the amount of charge possessed by oxygen or hydrogen existing in the electrode chamber of the electrode having a larger deterioration rate and the amount of charge possessed by the electrode itself is larger than the sum of the amount of charge possessed by hydrogen or oxygen existing in the electrode chamber of the electrode having a smaller deterioration rate and the amount of charge possessed by the electrode itself.

The present inventors have found that the degree of deterioration is larger in the case of deterioration due to an increase in the potential of the electrode for hydrogen generation 16 including platinum to the vicinity of the potential of the electrode for oxygen generation 12 than in the case of deterioration due to a decrease in the potential of the electrode for oxygen generation 12 including platinum or iridium to the vicinity of the potential of the electrode for hydrogen generation 16, that is, the number of life of the electrode for hydrogen generation 16 is smaller than the number of life of the electrode for oxygen generation 12. In this case, a state is to be kept in which the sum of the amount of negative charge possessed by hydrogen existing in the hydrogen generation electrode chamber 18 and the amount of charge possessed by the electrode for hydrogen generation 16 is larger than the sum of the amount of positive charge possessed by oxygen existing in the oxygen generation electrode chamber 14 and the amount of charge possessed by the electrode for oxygen generation 12.

Therefore, the method for controlling the hydrogen generation system 1 according to the present embodiment includes maintaining a state of $Q_{AN\_electrode} + Q_{AN\_O_2} < Q_{CA\_electrode} + Q_{CA\_H_2}$ in a case where the deterioration rate $d_{CA}$ of the electrode for hydrogen generation 16 is larger than the deterioration rate $d_{AN}$ of the electrode for oxygen generation 12, and maintaining a state of $Q_{AN\_electrode} + Q_{AN\_O_2} > Q_{CA\_electrode} + Q_{CA\_H_2}$ in a case where the deterioration rate $d_{AN}$ of the electrode for oxygen generation 12 is larger than the deterioration rate $d_{CA}$ of the electrode for hydrogen generation 16, wherein $Q_{AN\_electrode}$ represents an amount of charge possessed by the electrode for oxygen generation 12, $Q_{CA\_electrode}$ represents an amount of charge possessed by the electrode for hydrogen generation 16, $Q_{AN\_O_2}$ represents an absolute value of an amount of positive charge possessed by oxygen existing in the oxygen generation electrode chamber 14, and $Q_{CA\_H_2}$ represents an absolute value of an amount of negative charge possessed by hydrogen existing in the hydrogen generation electrode chamber 18.

Specific Method 1 for Controlling Potential Change During Operation Stop

The hydrogen generation system 1 includes the first transfer mechanism 6 structured to transfer water to the oxygen generation electrode chamber 14, as a discharge mechanism to discharge oxygen in the oxygen generation electrode chamber 14. During operation, water is transferred to the oxygen generation electrode chamber 14, and thus oxygen in the oxygen generation electrode chamber 14 is discharged to the first circulation tank 26 side. Therefore, the method for controlling the hydrogen generation system 1 according to the present embodiment includes suppressing the discharge of oxygen after a lapse of a predetermined time from stopping supply of the electrolytic current at a time of a shift to an operation stop of the hydrogen generation system 1 in a case where the deterioration rate $d_{CA}$ of the electrode for hydrogen generation 16 is larger than the deterioration rate $d_{AN}$ of the electrode for oxygen generation 12.

That is, the controller 10 suppresses the driving of the first transfer mechanism 6 after a lapse of a predetermined time from stopping supply of the electrolytic current from the power source 4. The amount of oxygen existing in the oxygen generation electrode chamber 14 can be reduced by continuously transferring water to the oxygen generation electrode chamber 14 even after the stop of supply of the electrolytic current. Thus, a state can be maintained in which the amount of negative charge in the hydrogen generation electrode side is larger than the amount of positive charge in the oxygen generation electrode side to suppress the potential fluctuation in the electrode for hydrogen generation 16 that is likely to deteriorate.

The term "suppressing discharge" means that the discharge amount of oxygen (in other words, transfer amount of water) is reduced to preferably 1/100 or less, and more preferably 1/1,000 or less of the discharge amount at the time of rated electrolysis, and still more preferably 0, that is, the discharge is completely stopped. The above-described "predetermined time" can be set in advance on the basis of an experiment or simulation by a designer. For example, the predetermined time is a time required until all the oxygen gas in the oxygen generation electrode chamber 14 is expelled to the first circulation tank 26 side and the oxygen generation electrode chamber 14 is filled with water.

Furthermore, the method for controlling of the present embodiment includes stopping supply of the electrolytic current after a lapse of a predetermined time from suppressing discharge of oxygen from the oxygen generation electrode chamber 14 at a time of a shift to an operation stop of the hydrogen generation system 1 in a case where the deterioration rate $d_{AN}$ of the electrode for oxygen generation 12 is larger than the deterioration rate $d_{CA}$ of the electrode for hydrogen generation 16.

That is, the controller 10 stops supply of the electrolytic current from the power source 4 after a lapse of a predetermined time from suppressing the driving of the first transfer mechanism 6. The amount of oxygen existing in the oxygen generation electrode chamber 14 can be increased by suppressing transfer of water to the oxygen generation electrode chamber 14 before the stop of supply of the electrolytic current. Thus, a state can be maintained in which the amount of positive charge in the oxygen generation electrode side is larger than the amount of negative charge in the hydrogen generation electrode side to suppress the potential fluctuation in the electrode for oxygen generation 12 that is likely to deteriorate.

The term "suppressing discharge" means that the discharge amount of oxygen is reduced to preferably 1/100 or less, and more preferably 1/1,000 or less of the discharge amount at the time of rated electrolysis, and still more preferably 0, that is, the discharge is completely stopped. The above-described "predetermined time" can be set in advance on the basis of an experiment or simulation by a designer. For example, the predetermined time is a time required until the oxygen generation electrode chamber 14 is filled with an oxygen gas.

The present inventors verified an effect obtained by the above-described specific method 1 on the basis of Example 1 and Comparative Example 1 described below.

Example 1

First, a PEM water electrolyzer was prepared that included an electrode for oxygen generation including iridium oxide ($IrO_2$) (geometric area: 25 $cm^2$), an oxygen generation electrode chamber (volume: 2 mL), an electrode for hydrogen generation including platinum-carrying carbon (Pt/C) (geometric area: 25 $cm^2$), a hydrogen generation electrode chamber (volume: 2 mL), and a reference electrode (standard hydrogen electrode) inserted into the hydrogen generation electrode chamber. Then, using this PEM water electrolyzer, a water electrolysis test was performed at a current density of 1.0 A/cm². During the electrolysis, the entire electrolyzer was kept at 80° C., ultrapure water was transferred to the electrode for oxygen generation at a flow rate of 30 mL/min, and no water was transferred to the electrode for hydrogen generation. The voltage of the electrolyzer at this time was 1,856 mV.

Next, the electrode for oxygen generation of the PEM water electrolyzer was subjected to the above-described potential cycle test as a deterioration acceleration test. Specifically, 5,000 cycles were repeated in the potential cycle test using an electrochemical evaluation device (HZ-5000 (HAG3010) manufactured by HOKUTO DENKO CORPORATION) in a potential range of 0 V to 1.5 V with respect to the reference electrode at a sweep rate of 1.5 V/sec. After the potential cycle test, the water electrolysis test was performed again at a current density of 1.0 A/cm². As a result, the voltage of the electrolyzer was 1,859 mV. That is, the voltage of the electrolyzer increased by 3 mV due to deterioration of the electrode for oxygen generation. Therefore, the deterioration rate $d_{AN}$ was 0.6 μV/cycle.

Furthermore, the electrode for hydrogen generation of the PEM water electrolyzer was subjected to the above-described potential cycle test as a deterioration acceleration test. Specifically, 1,000 cycles were repeated in the potential cycle test using an electrochemical evaluation device (HZ-5000 (HAG3010) manufactured by HOKUTO DENKO CORPORATION) in a potential range of −0.2 V to 1.2 V with respect to the reference electrode at a sweep rate of 1.5 V/sec. After the potential cycle test, the water electrolysis test was performed again at a current density of 1.0 A/cm². As a result, the voltage of the electrolyzer was 1,942 mV. The voltage during rated electrolysis immediately before this test was 1,901 mV. Therefore, the voltage of the electrolyzer increased by 31 mV due to deterioration of the electrode for hydrogen generation. Therefore, the deterioration rate $d_{CA}$ was 6.2 μV/cycle.

From the above-described results, it was confirmed that the deterioration rate $d_{CA}$ of the electrode for hydrogen generation was larger than the deterioration rate $d_{AN}$ of the electrode for oxygen generation. Therefore, this PEM water electrolyzer is to be controlled so that the potential of the electrode for hydrogen generation does not fluctuate during a stop of electrolysis.

Therefore, rated electrolysis and electrolysis stop control were performed using the PEM water electrolyzer with the following procedure. First, rated electrolysis was performed under the conditions of a current density of 1 A/cm², a temperature in the electrolyzer of 80° C., a circulation rate of ultrapure water to the oxygen generation electrode chamber of 30 cc/min, and no water circulation to the hydrogen generation electrode chamber. The voltage of the electrolyzer at this time was 2,014 mV. Subsequently, as electrolysis stop control, first, the supply of the electrolytic current from the power source was stopped, and 20 seconds after that, the circulation of ultrapure water to the oxygen generation electrode chamber was stopped. At the time of completion of this stepwise stop control, the hydrogen generation electrode chamber was filled with a hydrogen gas, and the oxygen generation electrode chamber was filled with ultrapure water.

At the stop of electrolysis and the stop of water circulation to the oxygen generation electrode chamber, the amounts of charge possessed by both the electrodes and both the electrode chambers were measured using an electrochemical evaluation device (HZ-5000 (HAG3010) manufactured by HOKUTO DENKO CORPORATION). FIG. 2 is a table showing the amounts of charge possessed by both the electrodes and both the electrode chambers at the stop of electrolysis and at the stop of water circulation to the oxygen generation electrode chamber when the stepwise stop control according to Example 1 was performed.

As shown in FIG. 2, at the stop of electrolysis (at the stop of supply of the electrolytic power), the amount of charge of the electrode for oxygen generation $Q_{AN\_electrode}$ was 0.5 C, the amount of charge of oxygen existing in the oxygen generation electrode chamber $Q_{AN\_O_2}$ was 21.0 C, and therefore the sum of the amounts of charge in the oxygen generation electrode side $Q_{AN\ total}$ was 21.5 C. Meanwhile, the amount of charge of the electrode for hydrogen generation $Q_{CA\_electrode}$ was 3.2 C, the amount of charge of hydrogen existing in the hydrogen generation electrode chamber $Q_{CA\_H_2}$ was 17.2 C, and therefore the sum of the amounts of charge in the hydrogen generation electrode side $Q_{CA}$ total was 20.4 C. Therefore, the state at the stop of electrolysis was such that $Q_{AN\_electrode} + Q_{AN\_O_2} > Q_{CA\_electrode} + Q_{CA\_H_2}$.

Meanwhile, at the stop of water circulation to the oxygen generation electrode chamber, the amount of charge of the electrode for oxygen generation $Q_{AN\_electrode}$ was 0.5 C, the amount of charge of oxygen existing in the oxygen generation electrode chamber $Q_{AN\_O_2}$ was 0.5 C, and therefore the sum of the amounts of charge in the oxygen generation electrode side $Q_{AN\ total}$ decreased to 1.0 C. The sum of the amounts of charge in the hydrogen generation electrode side $Q_{CA\ total}$ was maintained at 20.4 C. Therefore, it was confirmed that the state of $Q_{AN\_electrode} + Q_A\_O_2 < Q_{CA\_electrode} + Q_{CA\_H_2}$ was obtained by the stepwise stop control.

Figure 3A:
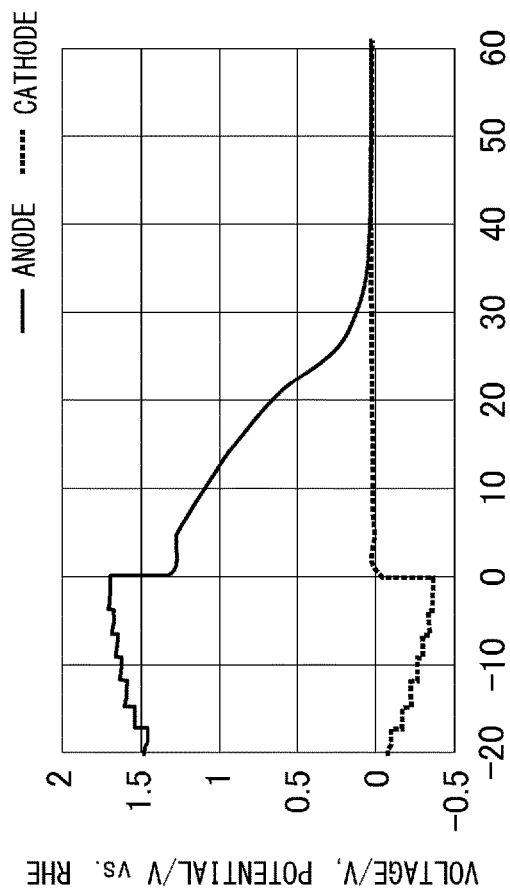
FIGS. 3(A) and 3(B) are graphs showing the potential change in each electrode when the stepwise stop control according to Example 1 is performed.
Figure 3B:
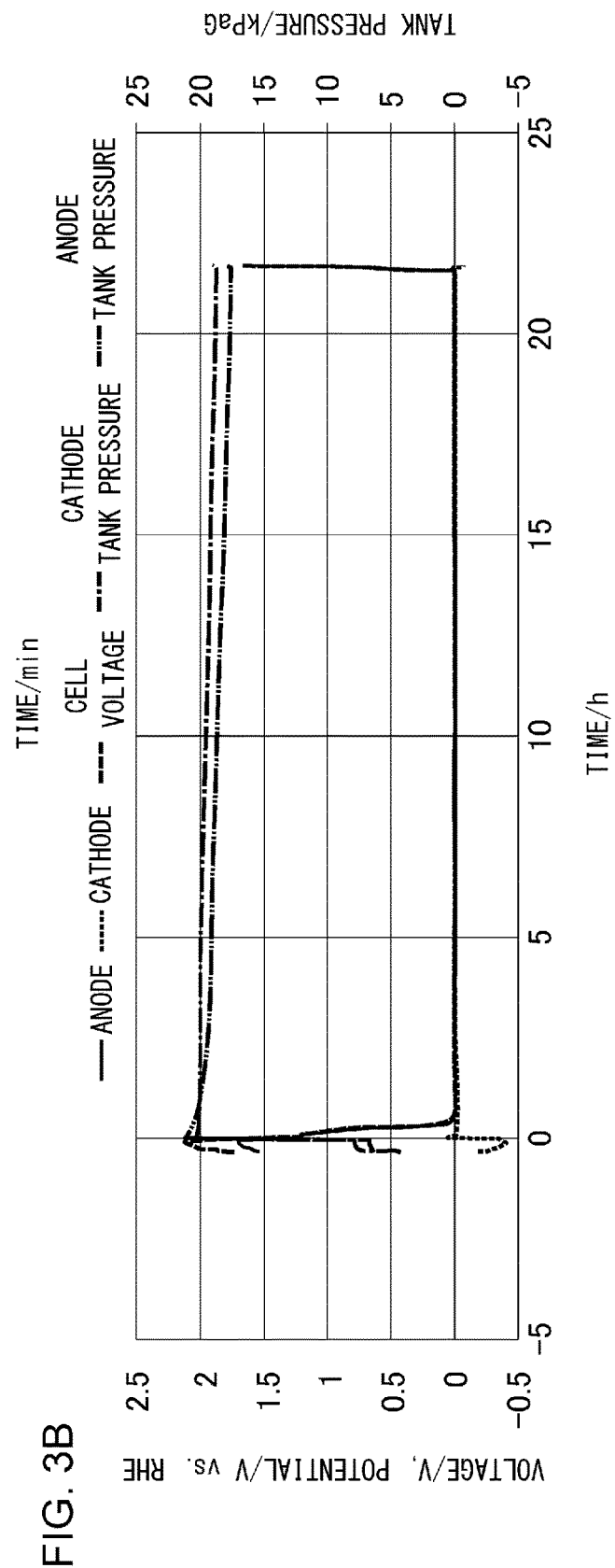

When the stepwise stop control was performed, the potential of the electrode for oxygen generation and the potential of the electrode for hydrogen generation were measured using a data recorder (LR8400 manufactured by HIOKI E.E. CORPORATION). FIGS. 3(A) and 3(B) are graphs showing the potential change in each electrode when the stepwise stop control according to Example 1 was performed. FIG. 3(B) also shows the internal pressure of the first circulation tank 26 (anode tank pressure) and the internal pressure of the second circulation tank 32 (cathode tank pressure).

As shown in FIG. 3(A), the potential of the electrode for oxygen generation (anode) gradually decreased from the stop of electrolysis (0 minute), and reached the potential of the electrode for hydrogen generation (cathode) after about 35 minutes. Meanwhile, the potential of the electrode for hydrogen generation changed little. After a lapse of 22 hours from the stop of rated electrolysis, rated electrolysis was performed again. As a result, as shown in FIG. 3(B), the voltage of the electrolyzer (cell voltage) was 2,014 mV, that is, the same value as the voltage during the first rated electrolysis.

Comparative Example 1

Rated electrolysis was performed using the same PEM water electrolyzer as used in Example 1 under the same conditions as in Example 1. The voltage of the electrolyzer at this time was 2,025 mV. Subsequently, electrolysis stop control was performed with the following procedure. That is, first, the circulation of ultrapure water to the oxygen generation electrode chamber was stopped, and 20 seconds after that, the supply of the electrolytic current from the power source was stopped. That is, in the electrolysis stop control in Comparative Example 1, the order of the stop of supply of the electrolytic current and the stop of transfer of water to the oxygen generation electrode chamber was reversed from the order in Example 1. Therefore, in Comparative Example 1, the transfer of water was stopped during rated electrolysis. This order of the stops corresponds to that in a conventional PEM water electrolyzer. At the time of completion of this stepwise stop control, the hydrogen generation electrode chamber was filled with a hydrogen gas, and the oxygen generation electrode chamber was filled with an oxygen gas.

Figure 4:
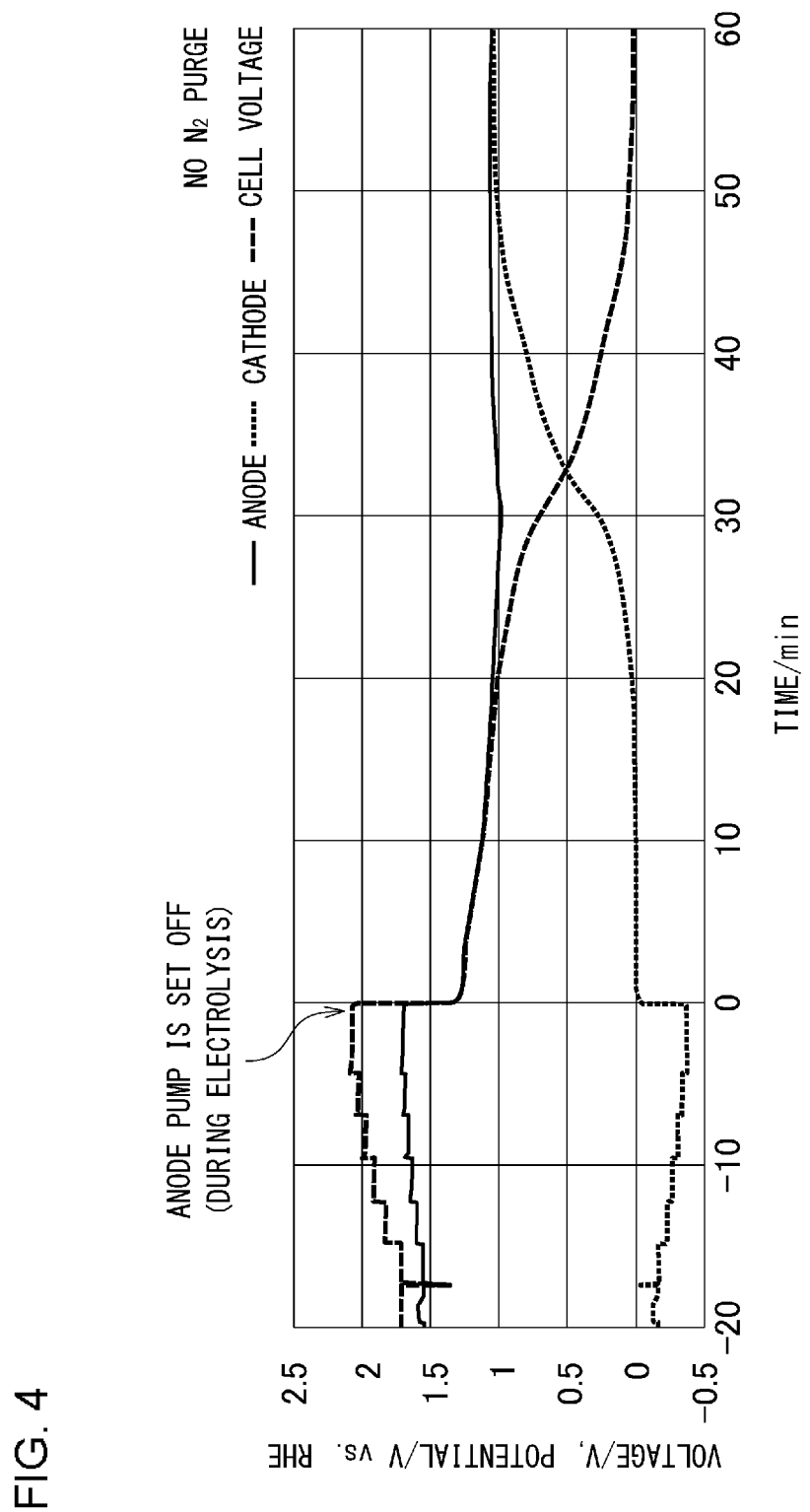
FIG. 4 is a graph showing the potential change in each electrode when electrolysis stop control according to Comparative Example 1 is performed.

As in Example 1, the potentials of both the electrodes were measured when the electrolysis stop control was performed. FIG. 4 is a graph showing the potential change in each electrode when the electrolysis stop control according to Comparative Example 1 was performed. As shown in FIG. 4, the potential of the electrode for hydrogen generation (cathode) gradually increased from about 20 minutes after the stop of electrolysis (0 minute), and reached the potential of the electrode for oxygen generation (anode) after about 50 minutes. Meanwhile, the potential of the electrode for oxygen generation changed little. After a lapse of 15 hours from the stop of rated electrolysis, rated electrolysis was performed again. As a result, the voltage of the electrolyzer was 2,028 mV, that is, 3 mV higher than the voltage during the first rated electrolysis.

From the above-described results, it has been confirmed that the potential fluctuation in the electrode for hydrogen generation having a larger deterioration rate can be suppressed by the stepwise stop control in which discharge of oxygen from the oxygen generation electrode chamber is stopped (suppressed) after a stop of electrolysis, and thus an increase in the voltage of the electrolyzer can be suppressed. From the results, it can be also understood that in a case where the deterioration rate of the electrode for oxygen generation is larger than the deterioration rate of the electrode for hydrogen generation, the potential fluctuation in the electrode for oxygen generation can be suppressed by the stepwise stop control in which discharge of oxygen from the oxygen generation electrode chamber is stopped before a stop of electrolysis.

The hydrogen generation system 1 may include a mechanism other than the first transfer mechanism 6, as a discharge mechanism to discharge oxygen in the oxygen generation electrode chamber 14. For example, the hydrogen generation system 1 may include, as the discharge mechanism, a gas transfer mechanism 48 structured to transfer an inert gas such as nitrogen to the oxygen generation electrode chamber 14. In this case, the gas transfer mechanism 48 transfers an inert gas to the oxygen generation electrode chamber 14, and thus the oxygen in the oxygen generation electrode chamber 14 is discharged to reduce the amount of the remaining oxygen in the oxygen generation electrode chamber 14.

For example, the gas transfer mechanism 48 includes a tank 50 for an inert gas, a gas flow path 52 connecting the oxygen generation electrode chamber 14 and the tank 50, and an on-off valve 54 provided within the gas flow path 52, and the on-off valve 54 is controlled by the controller 10. The controller 10 controls the on-off valve 54, and thus can switch between a transfer of the inert gas from the tank 50 to the oxygen generation electrode chamber 14 and a stop of the transfer. The gas transfer mechanism 48 may supply a reducing gas having a reducing action on the electrode for oxygen generation 12, such as a hydrogen gas, to the oxygen generation electrode chamber 14.

Specific Method 2 for Controlling Potential Change During Operation Stop

The hydrogen generation system 1 includes the second transfer mechanism 8 structured to transfer water to the hydrogen generation electrode chamber 18, as a discharge mechanism to discharge hydrogen in the hydrogen generation electrode chamber 18. During operation, water is transferred to the hydrogen generation electrode chamber 18, and thus hydrogen in the hydrogen generation electrode chamber 18 is discharged to the second circulation tank 32 side. Therefore, the method for controlling of the present embodiment includes stopping supply of the electrolytic current after a lapse of a predetermined time from suppressing discharge of hydrogen at a time of a shift to an operation stop of the hydrogen generation system 1 in a case where the deterioration rate $d_{CA}$ of the electrode for hydrogen generation 16 is larger than the deterioration rate $d_{AN}$ of the electrode for oxygen generation 12.

That is, the controller 10 stops supply of the electrolytic current from the power source 4 after a lapse of a predetermined time from suppressing the driving of the second transfer mechanism 8. The amount of hydrogen existing in the hydrogen generation electrode chamber 18 can be increased by suppressing transfer of water to the hydrogen generation electrode chamber 18 before the stop of supply of the electrolytic current. Thus, a state can be maintained in which the amount of negative charge in the hydrogen generation electrode side is larger than the amount of positive charge in the oxygen generation electrode side to suppress the potential fluctuation in the electrode for hydrogen generation 16 that is likely to deteriorate.

The term "suppressing discharge" means that the discharge amount of hydrogen (in other words, transfer amount of water) is reduced to preferably 1/100 or less, and more preferably 1/1,000 or less of the discharge amount at the time of rated electrolysis, and still more preferably 0, that is, the discharge is completely stopped. The above-described "predetermined time" can be set in advance on the basis of an experiment or simulation by a designer. For example, the predetermined time is a time required until the hydrogen generation electrode chamber 18 is filled with a hydrogen gas.

Furthermore, the method for controlling of the present embodiment includes suppressing discharge of hydrogen after a lapse of a predetermined time from stopping supply of the electrolytic current at a time of a shift to an operation stop of the hydrogen generation system 1 in a case where the deterioration rate $d_{AN}$ of the electrode for oxygen generation 12 is larger than the deterioration rate $d_{CA}$ of the electrode for hydrogen generation 16.

That is, the controller 10 suppresses the driving of the second transfer mechanism 8 after a lapse of a predetermined time from stopping supply of the electrolytic current from the power source 4. The amount of hydrogen existing in the hydrogen generation electrode chamber 18 can be reduced by continuously transferring water to the hydrogen generation electrode chamber 18 even after the stop of supply of the electrolytic current. Thus, a state can be maintained in which the amount of positive charge in the oxygen generation electrode side is sufficiently larger than the amount of negative charge in the hydrogen generation electrode side to suppress the potential fluctuation in the electrode for oxygen generation 12 that is likely to deteriorate.

The term "suppressing discharge" means that the discharge amount of hydrogen is reduced to preferably 1/100 or less, and more preferably 1/1,000 or less of the discharge amount at the time of rated electrolysis, and still more preferably 0, that is, the discharge is completely stopped. The above-described "predetermined time" can be set in advance on the basis of an experiment or simulation by a designer. For example, the predetermined time is a time required until all the hydrogen gas in the hydrogen generation electrode chamber 18 is expelled to the second circulation tank 32 side and the hydrogen generation electrode chamber 18 is filled with water.

The hydrogen generation system 1 may include a mechanism other than the second transfer mechanism 8, as a discharge mechanism to discharge hydrogen in the hydrogen generation electrode chamber 18. For example, the hydrogen generation system 1 may include, as the discharge mechanism, a gas transfer mechanism 40 structured to transfer an inert gas such as nitrogen to the hydrogen generation electrode chamber 18. In this case, the gas transfer mechanism 40 transfers an inert gas to the hydrogen generation electrode chamber 18, and thus the hydrogen in the hydrogen generation electrode chamber 18 is discharged to reduce the amount of the remaining hydrogen in the hydrogen generation electrode chamber 18.

For example, the gas transfer mechanism 40 includes a tank 42 for an inert gas, a gas flow path 44 connecting the hydrogen generation electrode chamber 18 and the tank 42, and an on-off valve 46 provided within the gas flow path 44, and the on-off valve 46 is controlled by the controller 10. The controller 10 controls the on-off valve 46, and thus can switch between a transfer of the inert gas from the tank 42 to the hydrogen generation electrode chamber 18 and a stop of the transfer. The gas transfer mechanism 40 may supply an oxidizing gas having an oxidizing action on the electrode for hydrogen generation 16, such as an oxygen gas, to the hydrogen generation electrode chamber 18.

Specific Method 3 for Controlling Potential Change During Operation Stop

The method for controlling of the present embodiment includes starting discharge of hydrogen in the hydrogen generation electrode chamber 18 at a time of or after starting supply of the electrolytic current at a time of a shift from an operation stop to an operation start of the hydrogen generation system 1 in a case where the deterioration rate $d_{CA}$ of the electrode for hydrogen generation 16 is larger than the deterioration rate $d_{AN}$ of the electrode for oxygen generation 12.

That is, the controller 10 starts the driving of the second transfer mechanism 8 at a time of or after starting supply of the electrolytic current from the power source 4. By stopping the second transfer mechanism 8 until the start of supply of the electrolytic current, it is possible to suppress reduction in the amount of the hydrogen gas existing in the hydrogen generation electrode chamber 18 during the stop of electrolysis. Thus, a state can be maintained in which the amount of negative charge in the hydrogen generation electrode side is larger than the amount of positive charge in the oxygen generation electrode side until the operation start of the hydrogen generation system 1 to suppress the potential fluctuation in the electrode for hydrogen generation 16 that is likely to deteriorate.

Furthermore, the method for controlling of the present embodiment includes starting discharge of oxygen in the oxygen generation electrode chamber 14 at a time of or after starting supply of the electrolytic current at a time of a shift from an operation stop to an operation start of the hydrogen generation system 1 in a case where the deterioration rate $d_{AN}$ of the electrode for oxygen generation 12 is larger than the deterioration rate $d_{CA}$ of the electrode for hydrogen generation 16.

That is, in a case where the electrode for oxygen generation 12 is more likely to deteriorate than the electrode for hydrogen generation 16, the controller 10 starts the driving of the first transfer mechanism 6 at a time of or after starting supply of the electrolytic current from the power source 4. By stopping the first transfer mechanism 6 until the start of supply of the electrolytic current, it is possible to suppress reduction in the amount of the oxygen gas existing in the oxygen generation electrode chamber 14 during the stop of electrolysis. Thus, a state can be maintained in which the amount of positive charge in the oxygen generation electrode side is larger than the amount of negative charge in the hydrogen generation electrode side until the operation start of the hydrogen generation system 1 to suppress the potential fluctuation in the electrode for oxygen generation 12 that is likely to deteriorate. The term "starting discharge" means that the discharge amount is increased from the discharge amount in a state of suppressing discharge to a discharge amount that is more than the discharge amount in the state.

The present inventors verified an effect obtained by the above-described specific method 3 on the basis of Example 2 and Comparative Example 2 described below.

Example 2

Rated electrolysis and stepwise stop control were performed using the same PEM water electrolyzer as used in Example 1 under the same conditions with the same procedure as in Example 1. Then, the operation stop state was maintained for 15 hours. At this time, the potentials of both the electrodes were 0 V.

Figure 5:
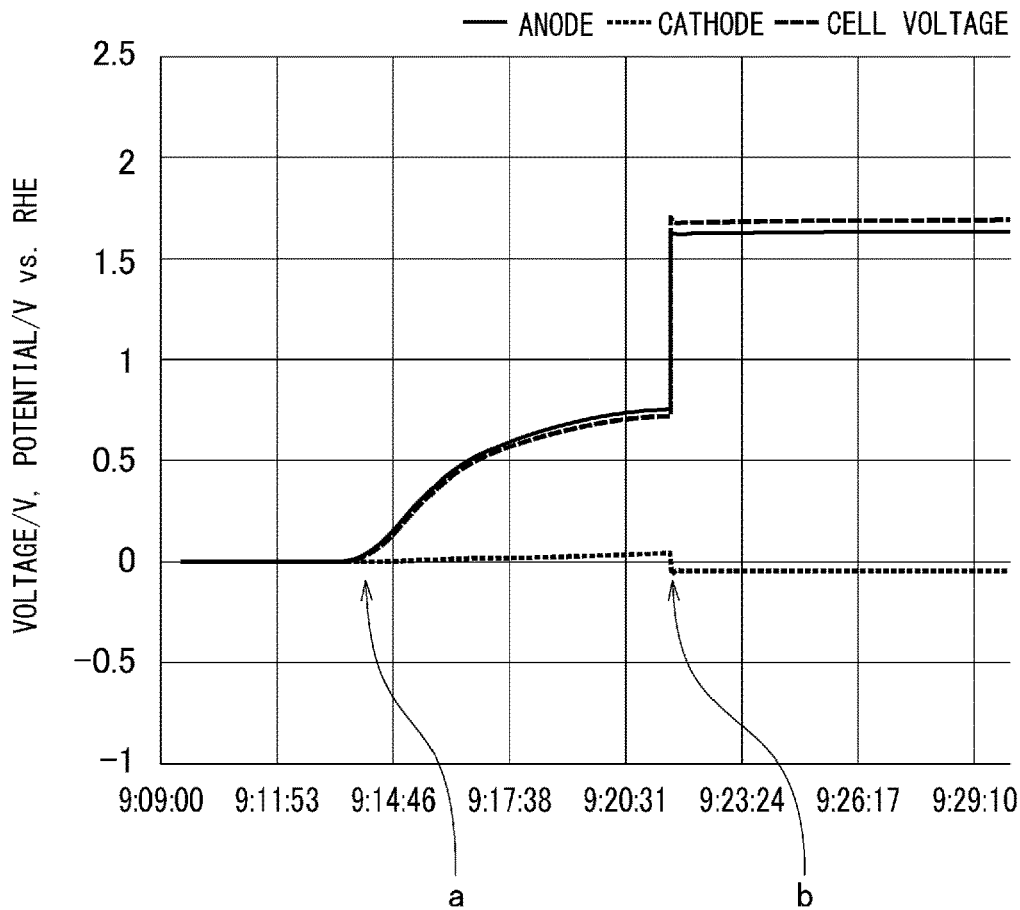
FIG. 5 is a graph showing the potential change in each electrode when electrolysis start control according to Example 2 is performed.

Then, while the potential of the electrode for oxygen generation and the potential of the electrode for hydrogen generation were measured using a data recorder (LR8400 manufactured by HIOKI E.E. CORPORATION), electrolysis start control was performed with the following procedure. FIG. 5 is a graph showing the potential change in each electrode when the electrolysis start control according to Example 2 was performed.

First, the first transfer mechanism 6 was driven to start transfer of water to the oxygen generation electrode chamber 14 (time a in FIG. 5). As a result, oxygen dissolved in water was supplied to the electrode for oxygen generation 12, and the potential of the electrode for oxygen generation (anode) increased. Meanwhile, a sufficient amount of hydrogen existed in the hydrogen generation electrode chamber 18 because the driving of the second transfer mechanism 8 remained stopped, and the state of $Q_{AN\_}$electrode+ $Q_{AN\_}O_2 < Q_{CA\_}$electrode+$Q_{CA\_}H_2$ was maintained. Therefore, the potential of the electrode for hydrogen generation 16 (cathode) remained at 0 V.

After a lapse of about 8 minutes from the start of driving of the first transfer mechanism 6, supply of the electrolytic current from the power source 4 and driving of the second transfer mechanism 8 were simultaneously started (time b in FIG. 5). As a result, the potential of the electrode for oxygen generation further increased, and the potential of the electrode for hydrogen generation slightly decreased. In the rated electrolysis after the restart of the operation, the voltage increased by 1 mV with respect to the voltage in the rated electrolysis before the operation stop.

Comparative Example 2

Figure 6:
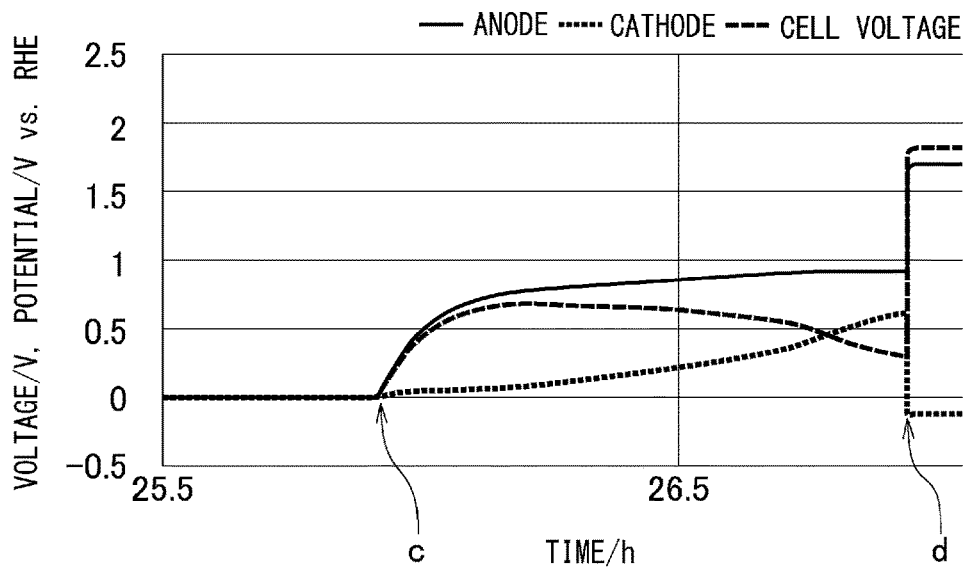
FIG. 6 is a graph showing the potential change in each electrode when electrolysis start control according to Comparative Example 2 is performed.

Rated electrolysis and stepwise stop control were performed using the same PEM water electrolyzer as used in Example 1 under the same conditions with the same procedure as in Example 1. Then, the operation stop state was maintained for 22 hours. Then, electrolysis start control was performed with the following procedure. In addition, the potentials of both the electrodes were measured in the same manner as in Example 2. FIG. 6 is a graph showing the potential change in each electrode when the electrolysis start control according to Comparative Example 2 was performed.

First, the first transfer mechanism 6 and the second transfer mechanism 8 were driven to start transfer of water to the oxygen generation electrode chamber and the hydrogen generation electrode chamber (time c in FIG. 6). This timing of driving corresponds to the timing of driving in a conventional PEM water electrolyzer. As a result, gas components were expelled from both the electrodes, and oxygen dissolved in the transferring water was supplied to the oxygen generation electrode chamber and the hydrogen generation electrode chamber. Thus, the state of $Q_{AN}$_electrode+$Q_{AN\_O_2}$>$Q_{CA}$_electrode+$Q_{CA\_H_2}$ was obtained. Therefore, not only the potential of the electrode for oxygen generation (anode) but also the potential of the electrode for hydrogen generation (cathode) increased.

After a lapse of about 60 minutes from the start of driving of the first transfer mechanism 6 and the second transfer mechanism 8, supply of the electrolytic current from the power source 4 was started (time d in FIG. 6). In the rated electrolysis after the restart of the operation, the voltage increased by 7 mV with respect to the voltage in the rated electrolysis before the operation stop.

From the above-described results, it has been confirmed that the potential fluctuation in the electrode for hydrogen generation having a larger deterioration rate can be suppressed by the electrolysis start control in which transfer of water to the hydrogen generation electrode chamber is waited until a start of supply of the electrolytic current, and thus an increase in the overvoltage of the electrolyzer can be suppressed. From the results, it can be also understood that in a case where the deterioration rate of the electrode for oxygen generation is larger than the deterioration rate of the electrode for hydrogen generation, the potential fluctuation in the electrode for oxygen generation can be suppressed by the electrolysis start control in which transfer of water to the oxygen generation electrode chamber is waited until a start of supply of the electrolytic current.

Specific Method 4 for Controlling Potential Change During Operation Stop

The method for controlling of the present embodiment includes supplying hydrogen to the hydrogen generation electrode chamber 18 during an operation stop of the hydrogen generation system 1 in a case where the deterioration rate $d_{CA}$ of the electrode for hydrogen generation 16 is larger than the deterioration rate $d_{AN}$ of the electrode for oxygen generation 12. Thus, a state can be maintained in which the amount of negative charge in the hydrogen generation electrode side is larger than the amount of positive charge in the oxygen generation electrode side to suppress the potential fluctuation in the electrode that is likely to deteriorate.

Furthermore, the method for controlling of the present embodiment includes supplying oxygen to the oxygen generation electrode chamber 14 during an operation stop of the hydrogen generation system 1 in a case where the deterioration rate $d_{AN}$ of the electrode for oxygen generation 12 is larger than the deterioration rate $d_{CA}$ of the electrode for hydrogen generation 16. Thus, a state can be maintained in which the amount of positive charge in the oxygen generation electrode side is larger than the amount of negative charge in the hydrogen generation electrode side to suppress the potential fluctuation in the electrode that is likely to deteriorate.

Examples of the mechanism to supply hydrogen to the hydrogen generation electrode chamber 18 include the above-described gas transfer mechanism 40. In this case, the tank 42 accommodates a hydrogen gas instead of the inert gas or the oxidizing gas. The controller 10 controls the on-off valve 46, and thus can switch between a transfer of the hydrogen gas from the tank 42 to the hydrogen generation electrode chamber 18 and a stop of the transfer. Examples of the mechanism to supply oxygen to the oxygen generation electrode chamber 14 include the above-described gas transfer mechanism 48. In this case, the tank 50 accommodates an oxygen gas instead of the inert gas or the reducing gas. The controller 10 controls the on-off valve 54, and thus can switch between a transfer of the oxygen gas from the tank 50 to the oxygen generation electrode chamber 14 and a stop of the transfer.

The mechanism to supply hydrogen to the hydrogen generation electrode chamber 18 may be such that hydrogen is dissolved in water to be transferred to the hydrogen generation electrode chamber 18 and that the second transfer mechanism 8 transfers this water to the hydrogen generation electrode chamber 18. Similarly, the mechanism to supply oxygen to the oxygen generation electrode chamber 14 may be such that oxygen is dissolved in water to be transferred to the oxygen generation electrode chamber 14 and that the first transfer mechanism 6 transfers this water to the oxygen generation electrode chamber 14. The supply of hydrogen to the hydrogen generation electrode chamber 18 and the supply of oxygen to the oxygen generation electrode chamber 14 may be continued from an operation stop of the hydrogen generation system 1 to the restart of the operation, or may be stopped after a lapse of a predetermined time.

Other Specific Methods for Controlling Potential Change During Operation Stop

In a case where the electrode for hydrogen generation 16 is more likely to deteriorate than the electrode for oxygen generation 12, the hydrogen generation electrode chamber 18 may have a larger volume than the oxygen generation electrode chamber 14. Thus, a state can be maintained in which the amount of negative charge in the hydrogen generation electrode side is larger than the amount of positive charge in the oxygen generation electrode side. In a case where the electrode for oxygen generation 12 is more likely to deteriorate than the electrode for hydrogen generation 16, the oxygen generation electrode chamber 14 may have a larger volume than the hydrogen generation electrode chamber 18. Thus, a state can be maintained in which the amount of positive charge in the oxygen generation electrode side is sufficiently larger than the amount of negative charge in the hydrogen generation electrode side.

Furthermore, in a case where the electrode for hydrogen generation 16 is more likely to deteriorate than the electrode for oxygen generation 12, the inside of the hydrogen generation electrode chamber 18 may be pressurized at a time of a shift to an operation stop of the hydrogen generation system 1. Thus, the substance amount of the gaseous hydrogen existing in the hydrogen generation electrode chamber 18 can be increased, and therefore a state can be maintained in which the amount of negative charge in the hydrogen generation electrode side is larger than the amount of positive charge in the oxygen generation electrode side. This method can be realized if, for example, the hydrogen generation system 1 includes a pressurizing mechanism for the hydrogen generation electrode chamber 18 and the controller 10 controls the pressurizing mechanism.

In a case where the electrode for oxygen generation 12 is more likely to deteriorate than the electrode for hydrogen generation 16, the inside of the oxygen generation electrode chamber 14 may be pressurized at a time of a shift to an operation stop of the hydrogen generation system 1. Thus, the substance amount of the gaseous oxygen existing in the oxygen generation electrode chamber 14 can be increased, and therefore a state can be maintained in which the amount of positive charge in the oxygen generation electrode side is larger than the amount of negative charge in the hydrogen generation electrode side. This method can be realized if, for example, the hydrogen generation system 1 includes a pressurizing mechanism for the oxygen generation electrode chamber 14 and the controller 10 controls the pressurizing mechanism.

In a case where the electrode for hydrogen generation 16 is more likely to deteriorate than the electrode for oxygen generation 12, the electrode for hydrogen generation 16 may contain a material to increase the electrode capacitance, such as carbon. Thus, a state can be maintained in which the amount of negative charge in the hydrogen generation electrode side is larger than the amount of positive charge in the oxygen generation electrode side. In a case where the electrode for oxygen generation 12 is more likely to deteriorate than the electrode for hydrogen generation 16, the electrode for oxygen generation 12 may contain a material to increase the electrode capacitance, such as carbon. Thus, a state can be maintained in which the amount of positive charge in the oxygen generation electrode side is larger than the amount of negative charge in the hydrogen generation electrode side.

Note that the above-described specific methods 1 to 4 and other specific methods can be appropriately combined. Furthermore, the above-described specific methods 1 to 4 and other specific methods can be appropriately selected according to whether the electrolyzer 2 is a PEM water electrolyzer or an alkaline water electrolyzer.

As described above, the method for controlling the hydrogen generation system 1 according to the present embodiment includes controlling the potential of the electrode for oxygen generation 12 and the potential of the electrode for hydrogen generation 16 included in the electrolyzer 2 so that the potential change is smaller in the electrode for oxygen generation 12 or the electrode for hydrogen generation 16 having a larger deterioration rate due to the potential change generated during an operation stop than in the electrode having a smaller deterioration rate. Thus, by suppressing the potential change in the electrode having poor deterioration resistance, the hydrogen generation system 1 can have improved durability to produce hydrogen at low power for a longer period of time.

The deterioration rate $d_{AN}$ of the electrode for oxygen generation 12 is a value obtained, in a case where a potential cycle test is performed in which the potential of the electrode for oxygen generation 12 during rated electrolysis in the hydrogen generation system 1 and the potential obtained by subtracting the overvoltage from the potential of the electrode for hydrogen generation 16 during the rated electrolysis are repeatedly applied to the electrode for oxygen generation 12, by dividing the amount of change in voltage during rated electrolysis before and after the potential cycle test by the number of cycles. The deterioration rate $d_{CA}$ of the electrode for hydrogen generation 16 is a value obtained, in a case where a potential cycle test is performed in which the potential of the electrode for hydrogen generation 16 during rated electrolysis in the hydrogen generation system 1 and the potential obtained by subtracting the overvoltage from the potential of the electrode for oxygen generation 12 during the rated electrolysis are repeatedly applied to the electrode for hydrogen generation 16, by dividing the amount of change in voltage during rated electrolysis before and after the potential cycle test by the number of cycles. Thus, the hydrogen generation system 1 can have improved durability.

Furthermore, the method for controlling of the present embodiment includes maintaining a state of $Q_{AN\_electrode}+Q_{AN\_O_2}<Q_{CA\_electrode}+Q_{CA\_H_2}$ in a case where the deterioration rate $d_{CA}$ is larger than the deterioration rate $d_{AN}$, and maintaining a state of $Q_{AN\_electrode}+Q_{AN\_O_2}>Q_{CA\_electrode}+Q_{CA\_H_2}$ in a case where the deterioration rate $d_{AN}$ is larger than the deterioration rate $d_{CA}$, wherein $Q_{AN\_electrode}$ represents an amount of charge possessed by the electrode for oxygen generation 12, $Q_{CA\_electrode}$ represents an amount of charge possessed by the electrode for hydrogen generation 16, $Q_{AN\_O_2}$ represents an absolute value of an amount of positive charge possessed by oxygen existing in the oxygen generation electrode chamber 14, and $Q_{CA\_H_2}$ represents an absolute value of an amount of negative charge possessed by hydrogen existing in the hydrogen generation electrode chamber 18. Thus, the hydrogen generation system 1 can have improved durability.

Furthermore, the method for production of the present embodiment includes suppressing discharge of oxygen in the oxygen generation electrode chamber 14 after a lapse of a predetermined time from stopping supply of the electrolytic current at a time of a shift to an operation stop in a case where the deterioration rate $d_{CA}$ is larger than the deterioration rate $d_{AN}$, or suppressing supply of the electrolytic current after a lapse of a predetermined time from stopping discharge of oxygen in the oxygen generation electrode chamber 14 at a time of a shift to an operation stop in a case where the deterioration rate $d_{AN}$ is larger than the deterioration rate $d_{CA}$. Thus, the hydrogen generation system 1 can have improved durability.

Furthermore, the method for controlling of the present embodiment includes stopping supply of the electrolytic current after a lapse of a predetermined time from suppressing discharge of hydrogen in the hydrogen generation electrode chamber 18 at a time of a shift to an operation stop in a case where the deterioration rate $d_{CA}$ is larger than the deterioration rate $d_{AN}$, or suppressing discharge of hydrogen in the hydrogen generation electrode chamber 18 after a lapse of a predetermined time from stopping supply of the electrolytic current at a time of a shift to an operation stop in a case where the deterioration rate $d_{AN}$ is larger than the deterioration rate $d_{CA}$. Thus, the hydrogen generation system 1 can have improved durability.

Furthermore, the method for controlling of the present embodiment includes starting discharge of hydrogen in the hydrogen generation electrode chamber 18 at a time of or after starting supply of the electrolytic current at a time of a shift from an operation stop to an operation start in a case where the deterioration rate $d_{CA}$ is larger than the deterioration rate $d_{AN}$, or starting discharge of oxygen in the oxygen generation electrode chamber 14 at a time of or after starting supply of the electrolytic current at a time of a shift from an operation stop to an operation start in a case where the deterioration rate $d_{AN}$ is larger than the deterioration rate $d_{CA}$. Thus, the hydrogen generation system 1 can have improved durability.

Furthermore, the method for controlling of the present embodiment includes supplying hydrogen to the hydrogen generation electrode chamber 18 during an operation stop in a case where the deterioration rate $d_{CA}$ is larger than the deterioration rate $d_{AN}$, or supplying oxygen to the oxygen generation electrode chamber 14 during an operation stop in a case where the deterioration rate $d_{AN}$ is larger than the deterioration rate $d_{CA}$. Thus, the hydrogen generation system 1 can have improved durability.

Embodiments of the present invention are described in detail above. The above-described embodiments are merely specific examples to carry out the present invention. The contents of the embodiments do not limit the technical scope of the present invention, and many design changes such as changes, additions, and deletions of the constituent elements can be made without departing from the spirit of the invention defined in the claims. A new embodiment in which a design change is made has effects of both an embodiment and a modification that are combined. In the above-described embodiment, the contents in which such a design change can be made are emphasized with a notation such as "of the present embodiment" or "in the present embodiment", but a design change is allowed even in contents without such a notation. Any combination of the above-described constituent elements is also effective as an aspect of the present invention.

An embodiment may be identified by the item described below.

Item 1

A hydrogen generation system 1 including
an electrolyzer 2 including an electrode for oxygen generation 12, an electrode for hydrogen generation 16, an oxygen generation electrode chamber 14 accommodating the electrode for oxygen generation 12, a hydrogen generation electrode chamber 18 accommodating the electrode for hydrogen generation 16, and a diaphragm 20 separating the oxygen generation electrode chamber 14 and the hydrogen generation electrode chamber 18, the electrolyzer 2 structured to generate hydrogen by electrolysis of water, a power source 4 structured to supply an electrolytic current to the electrolyzer 2, and a controller 10 structured to control a potential of the electrode for oxygen generation 12 and a potential of the electrode for hydrogen generation 16, the electrode for oxygen generation 12 having a deterioration characteristic of deteriorating at a predetermined deterioration rate $d_{AN}$ by a potential change generated during an operation stop in which the electrolytic current is not supplied to the electrolyzer 2, the electrode for hydrogen generation 16 having a deterioration characteristic of deteriorating at a predetermined deterioration rate $d_{CA}$ by a potential change generated during the operation stop, the controller 10 structured to control a potential of the electrode for oxygen generation 12 and a potential of the electrode for hydrogen generation 16 so that, the potential change is smaller in the electrode for oxygen generation 12 or the electrode for hydrogen generation 16 having a larger deterioration rate than in the electrode having a smaller deterioration rate.

The invention claimed is:

1. A method for controlling a hydrogen generation system, the hydrogen generation system including
an electrolyzer structured to generate hydrogen by electrolysis of water, and
a power source structured to supply an electrolytic current to the electrolyzer, the electrolyzer including an electrode for oxygen generation, an electrode for hydrogen generation, an oxygen generation electrode chamber accommodating the electrode for oxygen generation, a hydrogen generation electrode chamber accommodating the electrode for hydrogen generation, and a diaphragm separating the oxygen generation electrode chamber and the hydrogen generation electrode chamber, the electrode for oxygen generation having a deterioration characteristic of deteriorating at a predetermined deterioration rate $d_{AN}$ by a potential change generated during an operation stop in which the electrolytic current is not supplied to the electrolyzer, the electrode for hydrogen generation having a deterioration characteristic of deteriorating at a predetermined deterioration rate $d_{CA}$ by a potential change generated during the operation stop, the method comprising controlling a potential of the electrode for oxygen generation and a potential of the electrode for hydrogen generation so that, the potential change is smaller in the electrode for oxygen generation or the electrode for hydrogen generation having a larger deterioration rate than in the electrode having a smaller deterioration rate.

2. The method for controlling the hydrogen generation system according to claim 1, wherein the deterioration rate $d_{AN}$ is a value obtained, in a case where the electrode for oxygen generation is subjected to a potential cycle test in which a potential of the electrode for oxygen generation during rated electrolysis in the hydrogen generation system and a potential obtained by subtracting an overvoltage from a potential of the electrode for hydrogen generation during the rated electrolysis are repeatedly applied to the electrode for oxygen generation, by dividing an amount of change in voltage during the rated electrolysis before and after the potential cycle test by a number of cycles, and the deterioration rate $d_{CA}$ is a value obtained, in a case where the electrode for hydrogen generation is subjected to a potential cycle test in which a potential of the electrode for hydrogen generation during the rated electrolysis and a potential obtained by subtracting an overvoltage from a potential of the electrode for oxygen generation during the rated electrolysis are repeatedly applied to the electrode for hydrogen generation, by dividing an amount of change in voltage during the rated electrolysis before and after the potential cycle test by a number of cycles.

3. The method for controlling the hydrogen generation system according to claim 1, further comprising:
maintaining a state of
$Q_{AN\_electrode}+Q_{AN\_O_2} < Q_{CA\_electrode}+Q_{CA\_H_2}$
in a case where the deterioration rate $d_{CA}$ is larger than the deterioration rate $d_{AN}$; or
maintaining a state of
$Q_{AN\_electrode}+Q_{AN\_O_2} > Q_{CA\_electrode}+Q_{CA\_H_2}$
in a case where the deterioration rate $d_{AN}$ is larger than the deterioration rate $d_{CA}$, wherein
$Q_{AN\_electrode}$ represents an amount of charge possessed by the electrode for oxygen generation,
$Q_{CA\_electrode}$ represents an amount of charge possessed by the electrode for hydrogen generation,
$Q_{AN\_O_2}$ represents an absolute value of an amount of positive charge possessed by oxygen existing in the oxygen generation electrode chamber, and $Q_{CA\_H_2}$ represents an absolute value of an amount of negative charge possessed by hydrogen existing in the hydrogen generation electrode chamber.

4. The method for controlling the hydrogen generation system according to claim 1, further comprising:

suppressing discharge of oxygen in the oxygen generation electrode chamber, the discharge performed by the hydrogen generation system during operation, after a lapse of a predetermined time from stopping supply of the electrolytic current at a time of a shift to the operation stop in a case where the deterioration rate $d_{CA}$ is larger than the deterioration rate $d_{AN}$; or stopping supply of the electrolytic current after a lapse of a predetermined time from suppressing the discharge at a time of a shift to the operation stop in a case where the deterioration rate $d_{AN}$ is larger than the deterioration rate $d_{CA}$.

5. The method for controlling the hydrogen generation system according to claim 1, further comprising:

stopping supply of the electrolytic current after a lapse of a predetermined time from suppressing discharge of hydrogen in the hydrogen generation electrode chamber, the discharge performed by the hydrogen generation system during operation, at a time of a shift to the operation stop in a case where the deterioration rate $d_{CA}$ is larger than the deterioration rate $d_{AN}$; or suppressing the discharge after a lapse of a predetermined time from stopping supply of the electrolytic current at a time of a shift to the operation stop in a case where the deterioration rate $d_{AN}$ is larger than the deterioration rate $d_{CA}$.

6. The method for controlling the hydrogen generation system according to claim 1, further comprising:

starting discharge of hydrogen in the hydrogen generation electrode chamber, the discharge performed by the hydrogen generation system during operation, at a time of or after starting supply of the electrolytic current at a time of a shift from the operation stop to an operation start in a case where the deterioration rate $d_{CA}$ is larger than the deterioration rate $d_{AN}$; or starting discharge of oxygen in the oxygen generation electrode chamber, the discharge performed by the hydrogen generation system during operation, at a time of or after starting supply of the electrolytic current at a time of a shift from the operation stop to an operation start in a case where the deterioration rate $d_{AN}$ is larger than the deterioration rate $d_{CA}$.

7. The method for controlling the hydrogen generation system according to claim 1, further comprising:

supplying hydrogen to the hydrogen generation electrode chamber during the operation stop in a case where the deterioration rate $d_{CA}$ is larger than the deterioration rate $d_{AN}$; or supplying oxygen to the oxygen generation electrode chamber during the operation stop in a case where the deterioration rate $d_{AN}$ is larger than the deterioration rate $d_{CA}$.

8. The method for controlling the hydrogen generation system according to claim 1, wherein the diaphragm includes a solid polymer electrolyte membrane, and the hydrogen generation system includes a first transfer mechanism structured to transfer pure water to the oxygen generation electrode chamber, and a second transfer mechanism structured to transfer pure water to the hydrogen generation electrode chamber.

9. A hydrogen generation system comprising:

an electrolyzer including an electrode for oxygen generation, an electrode for hydrogen generation, an oxygen generation electrode chamber accommodating the electrode for oxygen generation, a hydrogen generation electrode chamber accommodating the electrode for hydrogen generation, and a diaphragm separating the oxygen generation electrode chamber and the hydrogen generation electrode chamber, the electrolyzer structured to generate hydrogen by electrolysis of water;

a power source structured to supply an electrolytic current to the electrolyzer; and a controller structured to control a potential of the electrode for oxygen generation and a potential of the electrode for hydrogen generation, the electrode for oxygen generation having a deterioration characteristic of deteriorating at a predetermined deterioration rate $d_{AN}$ by a potential change generated during an operation stop in which the electrolytic current is not supplied to the electrolyzer, the electrode for hydrogen generation having a deterioration characteristic of deteriorating at a predetermined deterioration rate $d_{CA}$ by a potential change generated during the operation stop, the controller structured to control a potential of the electrode for oxygen generation and a potential of the electrode for hydrogen generation so that, the potential change is smaller in the electrode for oxygen generation or the electrode for hydrogen generation having a larger deterioration rate than in the electrode having a smaller deterioration rate.

* * * * *